United States Patent [19]
Ryan

[11] 3,717,594
[45] Feb. 20, 1973

[54] STABILIZING CATION RESINS
[75] Inventor: Leo F. Ryan, Somerville, N.J.
[73] Assignee: Ecodyne Corporation, Chicago, Ill.
[22] Filed: Jan. 19, 1970
[21] Appl. No.: 4,119

[52] U.S. Cl. ................................260/2.2 R, 210/38
[51] Int. Cl. ......................B01d 15/06, C02b 1/76
[58] Field of Search.......................................260/2.2

[56] References Cited

FOREIGN PATENTS OR APPLICATIONS

| | | |
|---|---|---|
| 42,920 | 2/1966 | Germany |
| 185,052 | 7/1966 | U.S.S.R. |

OTHER PUBLICATIONS

Koganovskii et al., Ukr. Khim. Zh. 1968, 34, 446–449 (abstr. supplied)
Brown, Effluent Water Treat. J. 1968, 8, 394–400 (abstr. supp.)
Sednev et al., Geterogennye Reaktsii i Reakts. Sposobnost, Sb. 1964, 20–25 (abstr.)
Helfferich, "Ion Exchange, " McGraw-Hill, New York, 1962 (p. 168)

*Primary Examiner*—Melvin Goldstein
*Attorney*—Hume, Clement, Hume & Lee, Charles M. Kaplan and Brinks, Wetzel, William, Cook, Clark, Lione, Cummins, Blanchard, Hofer

[57] ABSTRACT

Polyvinyl aryl sulfonate resins are stabilized against sulfonate leakage by leaching with water at a temperature of about 340° to 400° F. for at least about one hour to remove weakly held sulfonate groups. The resin may be further stabilized by converting about 5 to 30 percent of the ion exchange sites to the divalent or polyvalent metal form; preferably the barium or calcium form.

11 Claims, No Drawings

STABILIZING CATION RESINS

The present invention relates to a method for stabilizing cation exchange resins of the polyvinyl aryl sulfonated type.

Sulfonated polyvinyl aryl cation exchange resins are well known in the art. The preparation of such resins is described in U.S. Pat. No. 2,366,007 to D'Alelio. Such resins generally comprise polymers and copolymers of divinylbenzene with sulfonate groups substituted onto the benzene rings. These sulfonate groups have a negative charge, and therefore have the capability of forming cation exchange sites. A particularly desirable sulfonated polyvinyl aryl resin has a backbone chain that is a copolymer of styrene and divinylbenzene. Once the backbone polymer has been prepared, it is sulfonated by the use of conventional sulfonating agents such as concentrated sulfuric acid, fuming sulfuric acid, chlorosulfonic acid, etc. The product is then conventionally steamed to remove the excess sulfonating agent.

While polyvinyl aryl sulfonates are highly desirable and suitable ion exchange materials in most applications, a difficulty is encountered when such resins are to be employed where extreme purity of the water is required. Extreme purity is required, for example, in condensate polishing processes performed on the recycle water used on steam generating stations. Such polishing is carried out with both cation and anion exchange resins, the cation exchange resin being in the hydrogen or ammonium form, and the anion exchange resin being in the hydroxide form. For example, a well-known polishing process and apparatus is marketed under the POWDEX trademark by the Graver Water Conditioning Company. Patents related to such a process and apparatus include U.S. Pat. Nos. 3,250,703, 3,250,704 and 3,279,608, all of which are assigned to the assignee of this application. Such condensate polishing processes are frequently required to reduce the impurities in the recirculated water to levels not exceeding 3 parts per billion.

A difficulty that is encountered when such extreme purity levels are required is the contamination of the water by the leakage of sulfonate ions from the resin itself. It is believed that such leakage occurs primarily because some of the sulfonate groups are more weakly held on the resin than others. For example, some of the benzene rings may have more than one sulfonate group, and the excess sulfonate groups are more readily removed. This removal of sulfonate groups from the resin is increased at the elevated temperatures that are often encountered in condensate polishing processes.

Generally, the present invention relates to a method for stabilizing cation exchange resins of the polyvinyl aryl sulfonate type by removing excess sulfonate groups. In carrying out the method, the resin is leached with water at a temperature of about 340° to 400° F. for at least about 1 hour prior to use.

More specifically it has now been found that polyvinyl aryl sulfonate resins may be stabilized by leaching with water at a temperature of about 340° to 400° F. for at least about 1 hour. Improved results are obtained in accordance with the preferred embodiment when this leaching step is repeated at least twice, and wherein the resin is rinsed in water between the leaching steps. The temperature of the rinse water is not important, however, except that it should not be higher than about 400° F. In the preferred embodiment, the temperature of the leaching water is about 340° to 360° F. Also, for best results, it is preferred that each leaching step be performed over a time period of at least about 2 hours. These leaching steps remove excess sulfonate groups from the resin, and substantially reduce or eliminate the leakage of sulfonate ions into the water being treated.

It has also been found, in accordance with the most preferred embodiment of the present invention, that polyvinyl aryl sulfonate resins may be even further stabilized by contacting the resins with cations selected from the group consisting of divalent and polyvalent metal cations in an amount sufficient to convert about 5 to 30 percent of the ion exchange sites of the resin to the metal form. The preferred cations for use in such further stabilization are barium and calcium cations.

In the preferred embodiment, the resin is contacted with sufficient divalent or polyvalent metal cations to convert from 5 to 20 percent, and most preferably about 15 percent, of the ion exchange sites to the metal form. The percentage of the sites to be converted to the metal form depends upon a number of factors, the most important being the amount of metal leakage that can be tolerated. In condensate polishing processes, the metal leakage must be virtually zero. Metal leakage will, in turn, be influenced by the pH and ion concentration of the stream being treated. Another factor that must be considered is the temperature of the water being treated, since, as previously mentioned, the resin tends to be less stable at higher temperatures. Finally, a minor consideration is the reduction in ion exchange capacity of the resin by metal exchange. While small reductions are not significant in condensate polishing processes, at higher metal concentrations this reduction may become significant, and require frequent replacement of the exhausted resin.

When polyvinyl aryl sulfonate resins are stabilized with divalent or polyvalent cations subsequent to the above-described leaching step, it has been found that the tendency of the resin to lose sulfonate groups is virtually eliminated. The reason why such divalent and polyvalent cations stabilize the resin is not understood, although it is believed that these cations react with the most active sulfonate groups, and that these sulfonate groups are also the ones that are most likely to be removed from the resin during ion exchange.

While the method of the present invention causes a reduction in the ion exchange capacity of the resin, this reduction is relatively insignificant in polishing processes such as condensate polishing processes where high-capacity resins are not needed. As previously mentioned the objective is extreme purity of the water, and the water will ordinarily contain only very low levels of impurities when it is delivered to the ion exchange resin.

The following examples are intended to illustrate the present invention, and should not be construed as limitative, the scope of the invention being determined by the appended claims.

In the following examples, the resin used was Nalco HCR-W, a strongly acidic cation exchange resin having sulfonate groups on a styrene-divinylbenzene copolymeric backbone chain. The resin was in the 20–40 mesh bead size. This resin is marketed by the Nalco Chemical Company of Chicago, Illinois.

EXAMPLE I

About 50 pounds of fresh HCR–W resin was treated by passing 3 molar hydrochloric acid through it until it was converted to the hydrogen form. The beads were then rinsed with demineralized water until the conductivity of the effluent rinse water was reduced to 0.5 micromhos per centimeter.

The hydrogen-form resin beads were immersed in demineralized water in an autoclave, and the autoclave contents were heated to 350° F. and held at that temperature for 2 hours. The contents were then cooled to less than 212° F., the autoclave was opened, and the resin beads were rinsed with about 2 volumes of demineralized water. The autoclave was then refilled with sufficient demineralized water to immerse the resin beads and was resealed. The contents of the autoclave were reheated to 350° F. and held at that temperature for 2 hours. The contents were then cooled and rinsed as before. After draining, the beads were ground to a size of about 400 mesh for use in the Powdex process. A capacity measurement of the treated resin showed about a 2–4 percent loss in ultimate ion exchange capacity as compared to untreated resin of the same particle size.

A slurry of the ground resin was titrated with an ammonium hydroxide solution to a pH of 5 to convert the active sites to the ammonium form. The resin was then rinsed in a stream of demineralized water until the effluent conductivity was reduced to about 1 micromho per centimeter.

EXAMPLE II

One half of the resin slurry obtained in Example I was further treated by adding a 10 weight percent solution of barium chloride in an amount which had been calculated to be sufficient to convert 18 percent of the active ion exchange sites to the barium form. The slurry was agitated to ensure complete exchange. The resin was then rinsed in a stream of demineralized water until the conductivity of the effluent stream was reduced to about 1 micromho per centimeter.

EXAMPLE III

A 50-pound sample of fresh HCR–W resin was treated with 3 molar hydrochloric acid and rinsed with demineralized water as in Example I. A slurry of the resin was then treated by adding a 10 weight percent solution of barium chloride in an amount which had been calculated to be sufficient to convert about 40 percent of the ion exchange sites to the barium form. The slurry was agitated during this step. The resin was then rinsed in a stream of demineralized water until the conductivity of the effluent stream was reduced to about 1 micromho per centimeter.

EXAMPLE IV

The resins prepared in Examples I–III, together with some untreated Nalco HCR–W resin (ground to about 400 mesh) were mixed with anion exchange resin in the ratio of 5:1 cation:anion resin by weight. The anion resin was a strong base quaternary amine resin having a styrene-divinylbenzene copolymer backbone chain, distributed and sold by Nalco Chemical Company as Nalco SBR–P. The resins were mixed according to the method set forth in U.S. Pat. No. 3,277,270 to Capecci, which is assigned to the assignee of this application. The mixed resins were then pre-coated onto cylindrical filter elements in accordance with the method set forth in U.S. Pat. No. 3,250,703 to Levendusky, which is assigned to the assignee of this application. The filter elements were each pre-coated with 0.5 pounds of resin per square foot of filter surface area.

Individual pilot plant studies were run with a filtration unit having each of the aforementioned precoats. The ammoniated heater drain from a power station, having a pH of about 9.4 was continuously passed through the filter cartridges at a flow rate of 4.4 gallons per minute per square foot of filter surface area, and at a temperature of 352° F.

The acid conductivity peak of the effluent water was measured in each instance. This conductivity peak is indicative of the amount of sulfonate ions introduced into the water, since leakage of these ions will generate acid. The results are shown in the following table.

| Resin | Acid Conductivity Peak (micromhos per cm.*) |
| --- | --- |
| Example I | 0.45 |
| Example II | 0.25 |
| Example III | 0.6 |
| Untreated resin | 1.2 |

*measured above reference of 0.2 micromho/cm.

Surprisingly, the heat treatment of Example I reduced the conductivity peak by about 62 percent, even though the reduction in ion exchange sites was only about 2–4 percent. This result indicates that the treatment of Example I removed the most readily cleavable sulfonate groups.

The conversion of 18 percent of the active sites to the barium form in Example II further reduced the conductivity to about 56 percent of its previous value. This result also indicates that the most readily removable sulfonate groups are being stabilized, since the increase in stability is out of proportion to the amount of barium used. Finally, as the results obtained with the resin of Example III demonstrate, the conversion of 40 percent of the active sites to the barium form does not produce as significant an effect as the heat treatment alone. Because the conversion of such a large portion of the ion exchange sites to the barium form reduces the ion exchange capacity and increases the likelihood of barium leakage, the partial ion exchange of the resin with a divalent or polyvalent metal should not be performed except in conjunction with the high-temperature leaching step.

Obviously many modifications and variations of the invention as hereinbefore set forth will occur to those skilled in the art, and it is intended to cover in the appended claims all such modifications and variations as fall within the true spirit and scope of the invention.

I claim:

1. A method for stabilizing cation exchange resin of the polyvinyl aryl sulfonate type comprising: leaching said resin with water at a temperature of about 340° to 400° F. for at least about 1 hour whereby to remove weakly held sulfonate groups from said resin.

2. The method as defined in claim 1 wherein said leaching is carried out at least twice, and further including the step of rinsing said resin between said leachings.

3. The method as defined in claim 2 wherein the temperature of said water is about 340° to 360° F.

4. A method for stabilizing cation exchange resin of the polyvinyl aryl sulfonate type comprising: leaching said resin with water at a temperature of about 340° to 400° F. for at least about 1 hour whereby to remove weakly held sulfonate groups from said resin; and contacting said resin with an aqueous solution of cations selected from the group consisting of divalent and polyvalent metal cations in an amount sufficient to convert about 5 to 30 percent of the ion exchange sites of said resin to said cation form.

5. The method as defined in claim 4 wherein said cations are selected from the group consisting of barium and calcium.

6. The method as defined in claim 4 wherein said resin is contacted with an aqueous solution of said cations in an amount sufficient to convert about 5 to 20 percent of the ion exchange sites of said resin to said cation form.

7. The method as defined in claim 6 wherein said cations are selected from the group consisting of barium and calcium.

8. The method as defined in claim 7 wherein said cation is barium.

9. The method as defined in claim 8 wherein said resin is contacted with an aqueous solution of said barium cations in an amount sufficient to convert about 15 percent of the ion exchange sites of said resin to the barium form.

10. A method for stabilizing cation exchange resins of the polyvinyl aryl sulfonate type comprising: leaching said resin with water at a temperature of about 340° to 400° F. for a time period of about 1 to 3 hours; rinsing said resin; again leaching said resin at a temperature of about 340° to 400° F. for a time period of about 1 to 3 hours, whereby to remove weakly held sulfonate groups; and contacting said resin with an aqueous solution of cations selected from the group consisting of barium and calcium in an amount sufficient to convert about 5 to 20 percent of the ion exchange sites of said resin to said cation form.

11. The method as defined in claim 10 wherein the temperature of said water is in the range of about 340° to 360° F.

* * * * *